United States Patent [19]
Lawson

[11] 3,762,502
[45] Oct. 2, 1973

[54] TREE PLATFORM

[76] Inventor: John E. Lawson, Rt. 3, Oregon, Ill. 61061

[22] Filed: Oct. 13, 1972

[21] Appl. No.: 297,342

[52] U.S. Cl. .................................. 182/223, 182/92
[51] Int. Cl. ............................................. E04g 5/08
[58] Field of Search ..................... 182/223, 187, 90, 182/92; 47/42, 43

[56] References Cited
UNITED STATES PATENTS

| | | | |
|---|---|---|---|
| 918,275 | 4/1909 | Broome | 182/223 |
| 3,065,821 | 11/1962 | Hundley | 182/187 |

Primary Examiner—Reinaldo P. Machado
Attorney—Robert Muir

[57] ABSTRACT

A portable tree platform has a base plate which is hinged at the center. Two wooden portions are mounted on top of the base plate, one on either side of the hinge. Each wooden portion has a V-shape at the end remote from the hinge. The base plate terminates coextensively with the wooden portion except for an impaling portion at the center of each V-shaped end. In use, the platform is positioned in a fork of a tree with the impaling portions contiguous to the tree and with the hinged middle at a higher level. Forcing the middle downwardly forces the impaling portions into the tree and the V-shaped ends against opposite sides of the fork.

11 Claims, 4 Drawing Figures

PATENTED OCT 2 1973 3,762,502

3,762,502

TREE PLATFORM

BACKGROUND

The invention pertains to the art of scaffolds or platforms.

It is desirable to have a portable platform which can be mounted in a tree. Such apparatus is usable for hunting, photography, or merely observing animals. In the prior art, hunter's platforms have been provided which mount external of the shaft or, in other words, on the trunk of the tree. Such apparatus is shown in U. S. Pat. No. 3,460,649, issued Aug. 12, 1969 to James E. Baker, and in U. S. Pat. No. 3,513,940, issued May 16, 1970 to Frank G. Ussery. These are relatively complex and expensive items and it is desirable to provide a simplified apparatus for the same function.

SUMMARY

The present invention relates generally to scaffolds or platforms, and more particularly to a tree platform.

It is a general object of the present invention to provide a tree platform of considerably simplified construction.

Another object is to provide a tree platform which can be mounted in the fork of a tree.

Still another object is to provide a tree platform which is portable, and which can be folded into a small assemblage.

Yet another object of this invention is to provide a tree platform which can be quickly and simply mounted, and which is secure when mounted.

These, and other objects and advantages of the present invention, will be better understood from the following detailed description when taken in conjunction with the drawings.

DRAWINGS

DESCRIPTION

Figures 1, 2:
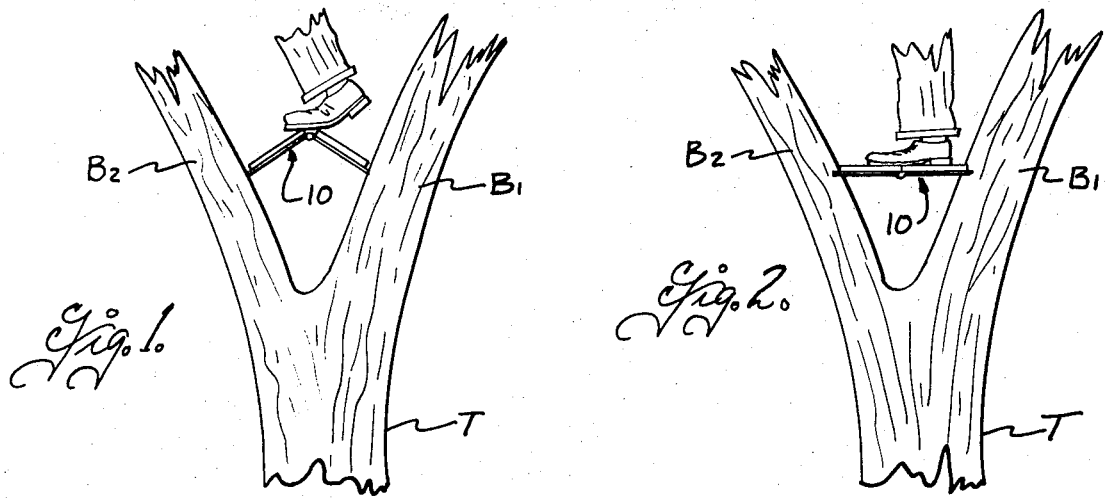
FIG. 1 is a view showing the fork of a tree and the apparatus of the present invention in position preparatory to being mounted on the tree.
FIG. 2 is a view similar to FIG. 1 but showing the apparatus of the present invention in mounted position.

Reference is now made more particularly to the drawings which illustrate the best presently known mode of carrying out the invention and wherein similar reference characters indicate the same parts througout the several views.

A tree platform, generally designated 10, is particularly adapted for mounting in the fork of a tree T. In the drawings, the fork of the tree is formed by branches $B_1$ and $B_2$. As shown in FIGS. 1 and 2, the tree platform 10 is articulated and is mounted by positioning the platform as shown in FIG. 1 and then pushing downwardly, as by the foot of the user, until the platform is in the mounted position shown in FIG. 2. When mounted on the tree, the platform can be used for hunting, photography, observing animals, or like uses.

In the preferred embodiment shown, the upper surface of the tree platform is formed by two wooden sections 12 and 12' which are advantageously identical. Adjacent ends of the sections are complementary to each other and abut in the mounted position for a purpose which will hereafter become apparent. At the ends opposite the adjacent ends, the sections have inwardly converging, V-shaped ends formed by edges 13, 14 and 13', 14', respectively. These edges are preferably straight or linear so that they will be tangent to the branch when in mounted position. It will be understood that these edges will still be tangent to the branch even though the mounting is accomplished on various diameter branches. Preferably, the interior angle between the straight edges 13 and 14 is 120°. This will give an interior angle of 60° at the center of the branch between imaginary radial lines extending to the points of tangent of the edges with the branch.

Underlying the sections 12 and 12' is a base plate which includes portions 20, 20'. Portion 20 is mounted on section 12 by a plurality of fasteners 21. Similarly, portion 20' is mounted on section 12' by fasteners 21'. The two portions are hinged about a hinge pin 24 to provide for pivotal movement of the tree platform. The base plate preferably includes pointed projections 25, 25' at opposite ends of the tree platform. The pointed projections are preferably at the center of the V-shaped end and extend outwardly thereof for piercing the branch when the tree stand is in the mounted position of FIG. 2.

Figure 3:
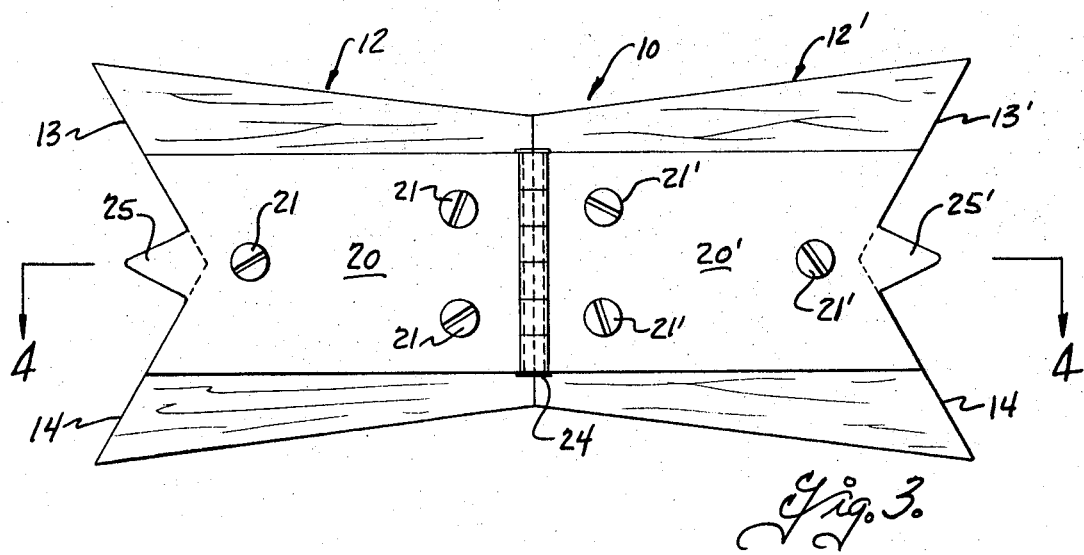
FIG. 3 is a bottom elevation of a preferred embodiment of the present invention.
Figure 4:
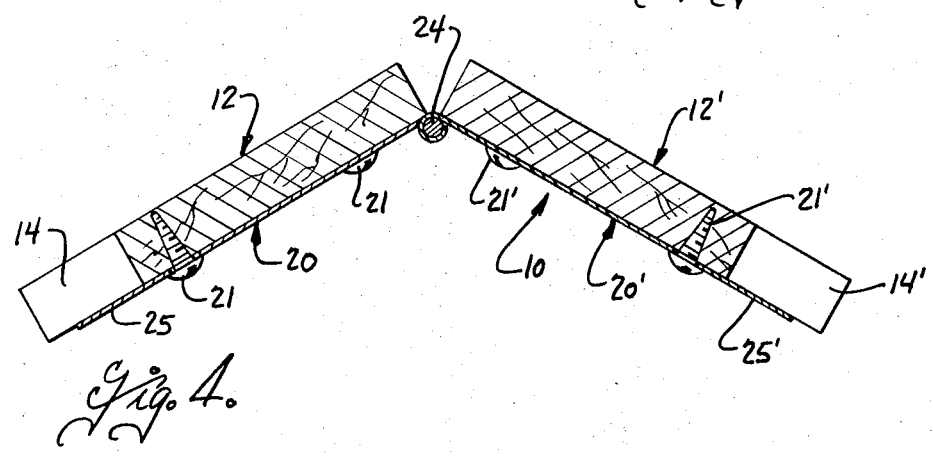
FIG. 4 is a longitudinal sectional view taken along line 4—4 of FIG. 3 and showing the apparatus in a moved position similar to that in FIG. 1.

It has been found that portions of the edges 13, 14, 13', 14' tend to wear after repeated use. Accordingly, it is advantageous to reinforce these edges. In the preferred embodiment illustrated, the reinforcing is accomplished by extending the base plate to a point coextensive with the edges 13, 14, 13', 14', as best seen in FIG. 3.

Thus, the base plate serves four functions: 1) as a mounting for the sections 12 and 12', 2) as a hinge for those sections, 3) as an impaling means for piercing the branches of the tree, and 4) as a reinforcement for the V-shaped ends of the sections 12 and 12'.

In one preferred embodiment of the invention, I form the first and second sections 12 and 12' from 1 X 6 inch wood. The central portion is somewhat narrower than the widest portion so that, when completely folded, the tree platform is wedge-shaped. In this folded position it may easily be inserted into a pocket or other holder. The widest portion is at the V-shaped ends so that the largest possible branches can be accommodated. As previously indicated, the interior angle at the V-shaped ends is preferably 120°. The base plate in this preferred embodiment is advantageously three inches in width and is of uniform width throughout. It is formed from ⅛ inch thick iron and has outer ends which are coextensive with the V-shaped ends of the first and second sections. The exception is the sharp points or impaling means 25, 25', which extend outwardly from the apex of the V-shaped edge about 1⅛ inches. It can be seen that the points are at a point inwardly of a line connecting the outer ends of edges 13, 14 or 13', 14'. The width of the impaling means, at its widest point, is seven-eighths inches. These dimensions have been found to be compact and portable yet sturdy and secure when mounted in position. The tree platform of the present invention is of considerably simplified construction which can be quickly and simply mounted as described above.

While a preferred embodiment of the invention has herein been illustrated and described, this has been done by way of illustration and not limitation, and the invention should not be limited except as required by the scope of the appended claims.

I claim:

1. A platform for mounting in a fork of a tree comprising: first and second sections having an upper supporting surface, adjacent ends which are complementary to each other, and inwardly converging V-shaped ends opposite the adjacent ends; a hinge swingably connecting the sections at their adjacent ends for movement of the sections between a generally planar position and a moved position in which the adjacent ends are raised above the level of the V-shaped ends; means providing a stop for limiting downward swinging movement at said generally planar position; impaling means extending outwardly from the center of each V-shaped end for penetrating the tree as the sections are moved to the generally planar position; whereby each branch of the fork of the tree is engaged by the V-shaped end and the impaling means; the hinge and impaling means being interconnected and formed from two metal plates; and each plate underlying one of said sections and being fastened thereto.

2. Apparatus according to claim 1 including reinforcing means at each V-shaped end for reinforcing at least part of the lower edge thereof to reduce wear of said edge.

3. Apparatus according to claim 2 wherein the reinforcing means and impaling means are of unitary construction being formed from said two metal plates.

4. A tree platform for mounting in the fork of a tree and comprising: first and second plates having an upper surface; first and second sections overlying a portion of the plates; a hinge interconnecting the plates for movement between a generally planar position and a moved position in which the hinge is raised above the level of the ends remote from the hinge; said remote end of each plate having an outwardly diverging, V-shape, as seen from above, for lying contiguous to the branch of a tree; a pointed projection extending outwardly from the center of the V-shaped end for piercing the branch when the end is contiguous thereto; and stop means providing a stop for the plates to prevent swinging movement at the planar position.

5. A tree platform as set forth in claim 4 wherein the stop means is formed by adjacent ends of the sections.

6. A tree platform as set forth in claim 5 wherein the plates are formed from metal and the sections are formed from wood, and including fasteners for mounting the sections on the plates.

7. A tree platform as set forth in claim 6 wherein the plates have parallel edges extending perpendiculr to the hinge axis; the sections have a width at their adjacent ends at least as wide as the plates at the hinge; the sections diverge in width from their adjacent ends to their remote end, the remote end of each section being of V-shape and coextensive with the V-shape end of the plate but not overlying the pointed projection.

8. A tree platform as set forth in claim 7 wherein the internal angle of the V-shaped ends is 120°.

9. A platform for mounting in a fork of a tree comprising: first and second sections having an upper supporting surface, adjacent ends which are complementary to each other, and inwardly converging V-shaped ends opposite the adjacent ends; a hinge swingably connecting the sections at their adjacent ends for movement of the sections between a generally planar position and a moved position in which the adjacent ends are raised above the level of the V-shaped ends; means providing a stop for limiting downward swinging movement at said generally planar position; and impaling means extending outwardly from the center of each V-shaped end for penetrating the tree as the sections are moved to the generally planar position; whereby each branch of the fork of the tree is engaged by the V-shaped end and the impaling means; reinforcing means at each V-shaped end for reinforcing at least part of the lower edge thereof to reduce wear of said edge; the reinforcing means and impaling means being of unitary construction and formed from two metal plates; and including fastening means for mounting the metal plates on the sections.

10. Apparatus according to claim 9 wherein the hinge and impaling means are interconnected.

11. Apparatus according to claim 10 wherein the hinge, impaling means, and reinforcing means are all formed from said two metal plates, and each plate underlying one of said sections and being fastened thereto.

* * * * *